UNITED STATES PATENT OFFICE.

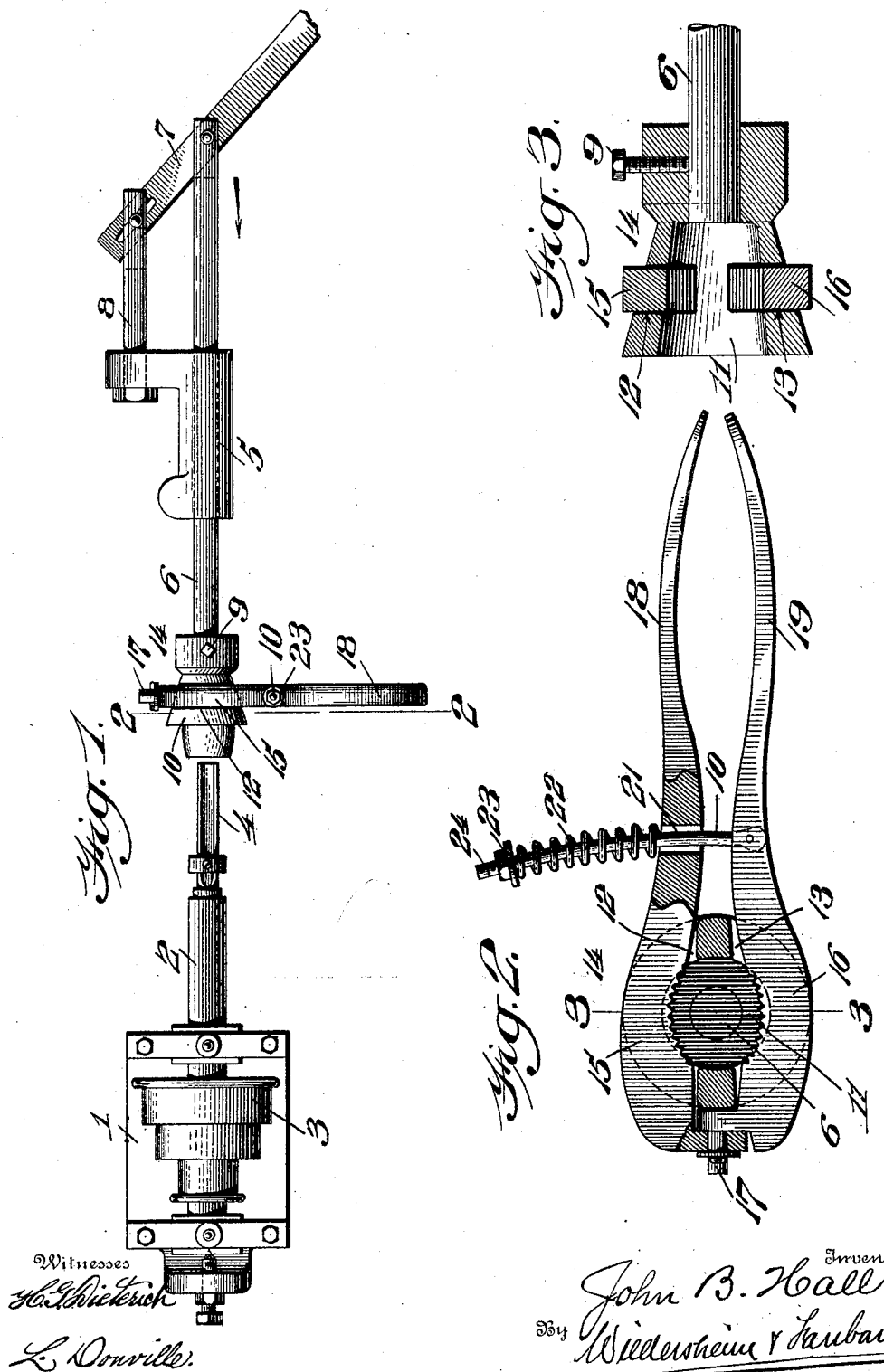

JOHN B. HALL, OF PHILADELPHIA, PENNSYLVANIA.

REAMING AND CLAMPING DEVICE FOR HORN AND OTHER MATERIAL.

No. 914,041.   Specification of Letters Patent.   Patented March 2, 1909.

Application filed July 27, 1908. Serial No. 445,532.

*To all whom it may concern:*

Be it known that I, JOHN B. HALL, a citizen of the United States, residing in the city and county of Philadelphia, State of Pennsylvania, have invented a new and useful Reaming and Clamping Device for Horn and other Material, of which the following is a specification.

My invention relates to a new and useful reaming and clamping device for horn and other material and consists in providing a clamping device for engaging the article to be reamed.

It further consists of novel details of construction, all as will be hereinafter fully set forth.

Figure 1 represents a plan view of the reaming and clamping device embodying my invention. Fig. 2 represents a sectional view on line 2—2, Fig. 1. Fig. 3 represents a sectional view on line 3—3, Fig. 2.

Similar numerals of reference indicate corresponding parts in the figures.

Referring to the drawings:—In reaming horn and other material I have found it difficult to properly hold and clamp the same in the machine and my invention is designed to overcome this defect. In the drawings I have shown a construction which I have found in practice to operate successfully, but it will be evident that the arrangement of the parts may be varied, changes may be made in the construction and other instrumentalities may be employed which will come within the scope of my invention and I do not therefore desire to be limited in every instance to the exact form as herein shown and described, but desire to make such changes as may be necessary.

1 designates a frame or support in which is rotatably mounted a spindle 2, to which power is imparted in any desired manner, in the present instance by the pulleys 3 around which passes a belt or other suitable actuating means.

4 designates a reamer or tool which is removably attached or connected with the spindle 2.

5 designates a fixed frame or support in which is movably mounted a rod 6, to which is attached an operating lever 7 which is pivotally connected with the fixed support 5, in the present instance through the medium of a bar 8. Removably connected with the rod 6, in the present instance by a set screw 9, is a tubular chuck 10 having a suitable bore 11 and in the walls of which are the slots 12 and 13.

14 designates the clamping device, consisting of the jaws 15 and 16, which are pivotally connected at 17 and which have connected thereto or integral therewith the handles 18 and 19, the inner faces of said jaws being serrated or provided with suitable teeth and said jaws being adapted to be seated in the recesses 12 and 13 in the chuck 10, as best understood from Fig. 2. Suitably connected with one of the handles, in the present instance the handle 19, is a pin 20 which passes through an opening 21 in the other handle and on which pin is mounted a coiled or other suitable spring 22, one end of which bears against the handle 18 and the opposite end of which bears against a nut 23 which is adjustably mounted on the threaded end 24 of the pin 20, it being understood that the tension of said spring can thus be adjusted and that the said spring tends to normally hold said handles together and thus the jaws as well.

The operation of the device is as follows:— The horn or other material to be treated is in the form of a cylinder and is inserted in the chuck 10 within the bore thereof, it being understood that the jaws 15 and 16 are opened by the operator grasping the handles 18 and 19 and opening the same against the tension of the spring 22, it being understood, more particularly from Fig. 2, that a portion of the jaws when in normal position, extends within the plane of the bore of the chuck and they must therefore be removed in order to insert the article. When this is in place the operator then returns the jaws to their proper position causing the same to grasp the article and by the operator imparting sufficient force to the handles, the said jaws will rigidly hold the article in place in the chuck. Motion being imparted to the reamer 4 the operator then grasps the handle or lever 7, and actuates the rod 6 in the direction indicated by the arrow in Fig. 1, bringing the horn or article up to the reamer and can continue to feed the same properly thereto, at the same time holding the jaws 15 and 16 tightly against the articles to prevent rotation thereof.

Having thus described my invention, what

I claim as new and desire to secure by Letters Patent, is:—

1. In a device of the character described, a cutter, a chuck, a longitudinally movable rod supporting said chuck, pivoted jaws carried by said chuck and normally projecting within the bore of said chuck, handles on said jaws for actuating the same, and a spring for normally holding the same in proper position.

2. In a device of the character described, a cutter, a chuck, a longitudinally movable rod supporting said chuck, pivoted jaws carried by said chuck and normally projecting within the bore thereof, handles on said jaws for actuating the same, a pin carried by one of said handles, and projecting through an opening in the other, and a spring on said pin for holding said jaws and handles in normal position.

3. In a device of the character described, a cutter, a chuck having openings in the wall thereof, pivoted jaws seated in said opening and projecting within the bore of said chuck, handles on the jaws for actuating the same, and means for normally holding said jaws and handles in proper position.

4. In a device of the character described, a chuck and an auxiliary holding device extending transversely through the chuck and presenting operating extensions exterior thereto.

5. In a device of the character described, a chuck, in combination with laterally extending pivoted jaws and operating extensions from said jaws laterally extending beyond the chuck.

6. In a device of the character described, a non-rotatable chuck and an auxiliary holding device having operating extensions projecting laterally beyond the chuck.

7. In a device of the character described, a non-rotatable chuck, a pair of transversely directed jaws lying within the chuck and pivoted to each other, and handles upon said jaws projecting beyond the side of the chuck.

8. In a device of the character described, a non-rotatable chuck, means for moving the chuck longitudinally, transverse jaws within said chuck, and handles for said jaws projecting laterally from the chuck.

9. In a device of the character described, a non-rotatable chuck, transverse jaws for said chuck pivoted on one side thereof, and spring pressed means for closing the jaws, located on the opposite side thereof.

10. In a device of the character described, a chuck and transversely extending spring pressed jaws therefor pivoted to each other.

11. In a device of the character described, a chuck, transversely extending jaws pivoted upon one side thereof, spring means for pressing the jaws together upon the other side thereof, and operating handles for said jaws extending beyond the chuck.

12. In a device of the character described, a non-rotatable chuck, transversely directed jaws pivoted upon one side of said chuck and having lateral operating extensions beyond the opposite side of said chuck, and spring means for pressing the jaws together.

JOHN B. HALL.

Witnesses:
CHARLES F. WOODRUFF,
LINNIE EISENHART.